United States Patent [19]

Gerhard

[11] Patent Number: 5,134,880
[45] Date of Patent: Aug. 4, 1992

[54] TIRE-PRESSURE MONITOR FOR VEHICLES

[75] Inventor: Hettich Gerhard, Dietenhofen, Fed. Rep. of Germany

[73] Assignee: Robert Bosch GmbH, Stuttgart, Fed. Rep. of Germany

[21] Appl. No.: 679,047
[22] PCT Filed: Oct. 3, 1989
[86] PCT No.: PCT/DE89/00624
  § 371 Date: May 6, 1991
  § 102(e) Date: May 6, 1991
[87] PCT Pub. No.: WO90/08663
  PCT Pub. Date: Aug. 9, 1990

[30] Foreign Application Priority Data
  Jan. 30, 1989 [DE] Fed. Rep. of Germany .... 3902644.2

[51] Int. Cl.$^5$ .............................................. B60C 23/04
[52] U.S. Cl. .......................... 73/146.5; 200/61.22; 200/61.25; 340/442
[58] Field of Search ............................ 73/146.5, 146.3; 340/442, 448; 200/61.22, 61.25

[56] References Cited

U.S. PATENT DOCUMENTS 5,040,562 8/1991 Achterholt ..................... 73/146.5
5,065,134 11/1991 Schmid et al. ..................... 340/442

Primary Examiner—Donald O. Woodiel
Attorney, Agent, or Firm—Michael J. Striker

[57] ABSTRACT

A tire-pressure monitor (13) comprising a pressure switch to be fixed to the periphery of the wheel rim (12) of vehicle wheels radially to the wheel axis is proposed, which pressure switch consists of a reference-pressure chamber (20) which is closed off towards the tire by an electrically conductive diaphragm (21). To close an electric circuit the diaphragm (21), when tire pressure is sufficient, is pressed onto a contact pin (22) inserted in an insulated manner into the reference-pressure chamber (20). To achieve an increase in the switching threshold as a function of speed, which increase can be determined in a defined manner, the diaphragm (21), free towards the tire, is provided with an elastic additional mass (30) which is applied over the surface to one diaphragm side and whose modulus of elasticity, in relation to that of the diaphragm (21) is less than one tenth.

5 Claims, 2 Drawing Sheets

TIRE-PRESSURE MONITOR FOR VEHICLES

PRIOR ART

The invention starts from a tire pressure monitor for motor vehicles according to the generic category of the main claim.

For high vehicle speeds of over 160 km/h, tire and vehicle manufacturers specify increased tire pressures in order to guarantee driving safety. If it is desired to make allowance for this, the switching threshold of the pressure switch fixed to the wheel must be set to the maximum pressure required. This leads to a loss in comfort at low speeds (German Offenlegungsschrift 3,243,845). If allowance is not made for this and the tire-pressure sensor is set to the tire pressure specified in the lower speed range at full load, at high speeds the requisite higher tire pressure will not be monitored, but on the contrary a safety which is absent will be falsely indicated by the tire-pressure monitoring device.

It is known from German Offenlegungsschrift 2,626,475 to provide the diaphragm of the reference-pressure chamber of a tire-pressure monitor with a solid piston against whose end face the tube of the tire to be monitored bears and which, when air pressure in the tire is sufficient, presses in the diaphragm against the pressure in the reference-pressure chamber to such an extent that an electrical contact is closed in the reference-pressure chamber. Furthermore, it is mentioned there that centrifugal forces on the piston of the diaphragm, when speed increases, advantageously reduce the force exerted on the diaphragm by the tire pressure so that, at higher speeds, the tire pressure must be increased in order to keep the switching contact closed. It is disadvantageous in this solution that the piston used as an additional mass for the diaphragm is covered by the tube of the tire so that the centrifugal forces acting upon it become effective only partly and in a completely indeterminable manner on the reference-pressure chamber for increasing the switching threshold. Furthermore, it is disadvantageous that this additional mass is securely riveted to the diaphragm in the centre of the same and thereby not only weakens the diaphragm but in addition, through the stiffening at the riveted point, affects the pressure-dependent and centrifugal force-dependent deformation of the diaphragm in a very variable and unpredictable manner. With this solution, therefore, it is not possible to increase the switching threshold to a reproducible extent at a certain speed relative to rest, since the speed-dependent increase in the switching threshold cannot be predetermined in this known embodiment.

With the present solution, the aim is to develop a tire-pressure monitor in which the additional mass is formed and arranged on the diaphragm of the reference-pressure chamber in such a way that the elasticity of the diaphragm is not thereby impaired and the switching threshold is increased as a function of speed by a predeterminable amount relative to rest.

The tire-pressure monitor according to the invention, having the characterizing features of the main claim, has the advantage that the additional mass, which is flexible compared with the rigid, preferably metallic diaphragm, no longer affects the elasticity and the strength of the diaphragm and in addition, by specific proportioning, permits a reproducible increase in the switching threshold as a function of the speed of the wheel. Thus, at high speeds of the vehicle, a signal is triggered by the tire-pressure monitoring device whenever the vehicle exceeds the maximum speed permissible for the existing tire pressure. The monitored minimum pressure in the tire is consequently increased in a defined manner as speed increases. A further advantage is that the characteristic curve of the threshold value, increasing as a function of speed, of the tire-pressure monitor, due to the centrifugal forces acting on the additional mass, progressively rises as speed increases. It is thus possible, over the entire speed range, to keep the threshold value at a sufficient distance above the pressure value at which the tire would be destroyed under full load (so-called destruction speed).

In patent application P 3,741,129.2, it has already been proposed to fix the additional mass in the form of a centrifugal weight in as point-like a manner as possible in the centre of the diaphragm by welding in order to maintain the sensitivity of the diaphragm. However, this solution is still unsatisfactory, since the diaphragm is inevitably damaged in its structure by the welding operation and since the strength of such a connection will only withstand the hard operating conditions and environmental influences if the additional mass is fixed to a sufficiently large diaphragm area, which in turn results in stiffening of the diaphragm. These shortcomings are avoided by attaching the elastic additional mass to the diaphragm area over the surface of the same by adhesive bonding, adhesion or the like.

Advantageous further developments and improvements of the features specified in the main claim result from the measures recited in the subclaims.

DRAWING

Exemplary embodiments of the invention are shown in the drawing and described in greater detail below. In the drawing, FIG. 1 shows the detail of a vehicle wheel with a tire-pressure monitor according to the invention inserted in the rim, FIG. 2 shows a cross-section through the tire-pressure monitor according to invention in an enlarged representation, FIG. 3 shows the speed-dependent characteristic curve for increasing the switching threshold, and FIGS. 4 and 5 show different embodiments for the attachment of the additional mass to the diaphragm.

DESCRIPTION OF THE EXEMPLARY EMBODIMENTS

Figure 1:
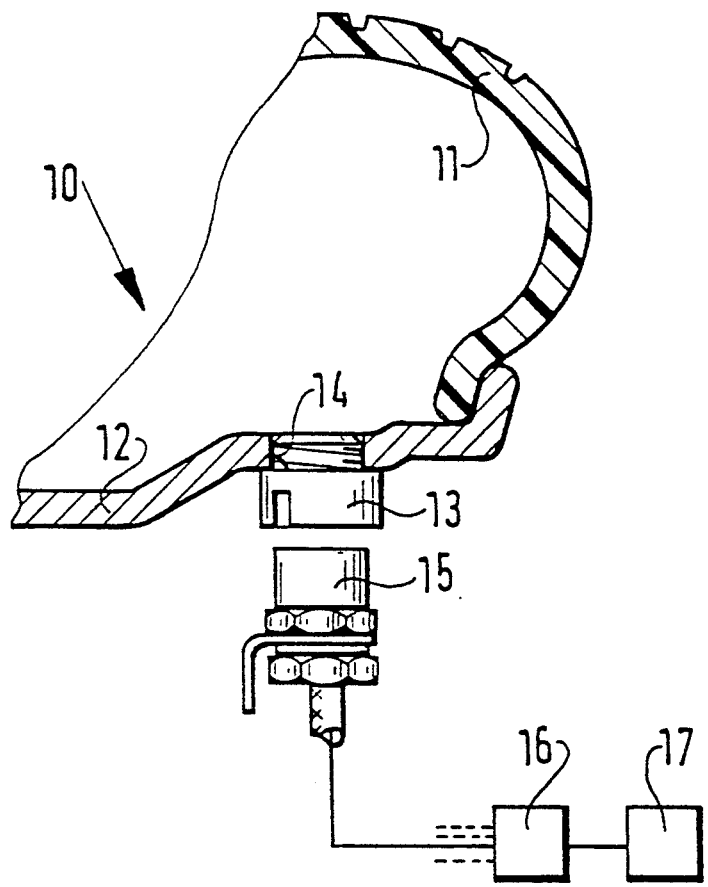

In FIG. 1, the detail of a motor vehicle is shown in cross-section to a reduced scale and is designated by 10. It shows a tire 11 which is fixed to a wheel rim 12. A tire-pressure monitor 13 is fixed to a section, directed to the inside, of the wheel rim 12 radially to the wheel axis in a tapped bore 14 of the wheel rim 12. At a slight distance therefrom, in the region of the tire-pressure monitor 13, a signal receiver 15 is fixed to the wheel suspension (not shown) of the vehicle, the end face of which signal receiver 15 is directed towards the tire-pressure monitor 13 and induced [sic] a high-frequency oscillation in the tire-pressure monitor 13 as soon as the latter runs past it during every rotation of the vehicle wheel 10. The receiver 15, together with the receivers of the other vehicle wheels, is connected to an analysing circuit 16 having a warning indicator 17 connected thereto, which warning indicator 17 transmits a warning signal when air pressure in one of the tires is too low.

Figure 2:
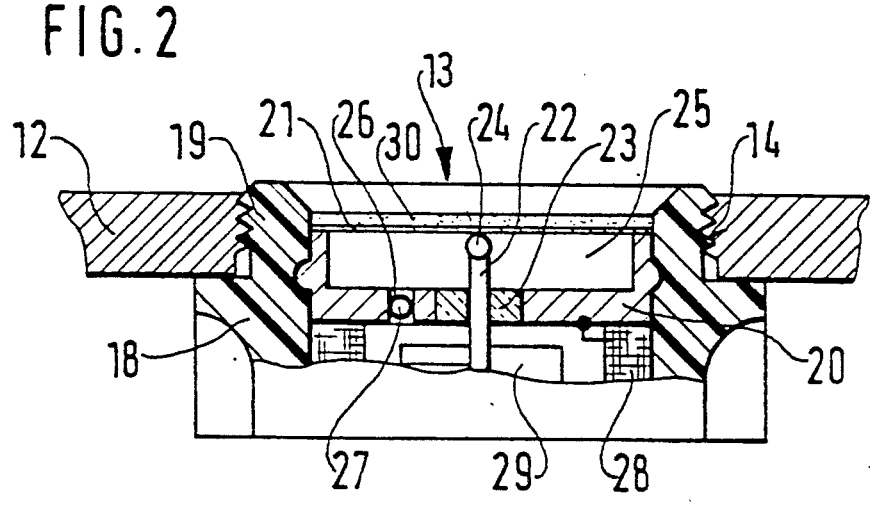

The construction of the tire-pressure monitor 13 is shown in FIG. 2. It consists of a housing 18 which is made of insulating material and which, with a threaded extension 19, is to be screwed into the tapped bore 14 of the wheel rim 12. The housing 18 is open at the front towards the tire 11. A reference-pressure chamber 20 made of steel is inserted in a positive-locking manner in the housing 18, which reference-pressure chamber 20 is closed off towards the tire by an electrically conductive diaphragm 21 made of high-grade steel. In the centre of the reference-pressure chamber 20, a contact pin 22, with a glass lead-through bushing 23, is fixed in a pressure-tight and electrically insulated manner in the bottom of the reference-pressure chamber 20. At its front end, it carries a welded-on contact ball 24, preferably made of gold. The diaphragm 21, in its outer region, is firmly welded by laser welding to the reference-pressure chamber 20 in a pressure-tight and stress-free manner. In the pressure space 25 formed by the reference-pressure chamber 20 and the diaphragm 21, air or nitrogen is fed at the required reference pressure via a feed channel 26 so that the diaphragm 21 only touches the contact ball 24 if the air pressure acting from outside on the diaphragm 21 reaches the minimum pressure to be monitored in the tire of the vehicle, i.e. the so-called threshold value. After the reference-pressure chamber 20 is filled, the feed channel 26 is closed pressure-tight by a ball 27 pressed or welded therein. Arranged below the reference-pressure chamber 20 is a toroidal coil 28 as well as a capacitor 29 in the housing 18 which are connected to one another in series and form an oscillating circuit which is opened or closed via the diaphragm 21 and the contact pin 22. For this purpose, the free end of the toroidal coil 28 is connected to the diaphragm 21 via the reference-pressure chamber 20, and, not discernible, the free end of the capacitor 29 is electrically bonded to the bottom end of the contact pin 22. If there is sufficient air pressure, the oscillating circuit is consequently closed, as a result of which the oscillation induced by the signal receiver 15 is dampened. The damping at sufficient air pressure through the closed oscillating circuit or the lack of damping at an air pressure which is too low through the opened oscillating circuit is detected by the analysing circuit 16.

An elastic additional mass 30 is applied over the surface to the outside of the diaphragm 21, which, in the assembled state of the tire-pressure monitor 13, lies parallel to the tread of the tubeless tire, the material of which additional mass 30 has a modulus of elasticity which is considerably less than 1/10th of the modulus of elasticity of the diaphragm 21. In the example according to FIG. 2, the additional mass 30 is applied with uniform thickness and over the full surface to the side of the diaphragm 21 directed towards the tire. Its material consists of a silicone adhesive which is filled with a metal powder. To increase the centrifugal force effect through the additional mass, provision is made to make this additional mass from a material having a higher specific weight compared with the diaphragm. In the example, the material of the additional mass 30 consists of a silicone adhesive having approximately 5% by volume of tungsten powder.

Figure 3:
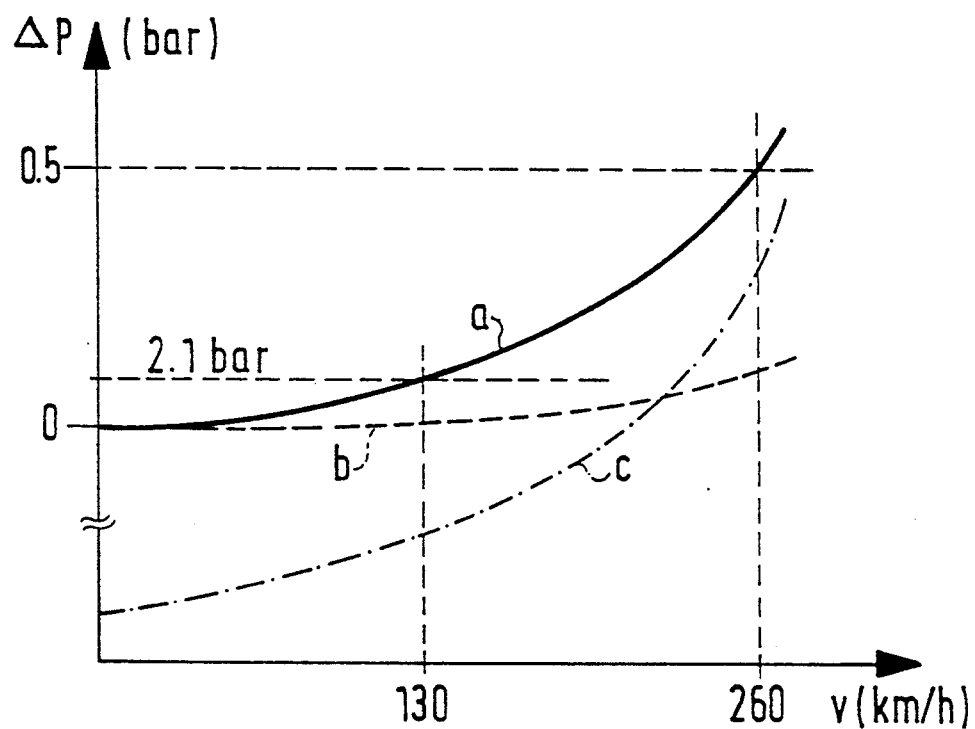

In FIG. 3, the characteristic curve a shows the progression of the switching threshold for a tire-pressure monitor 13 having the additional mass 30 as a function of the driving speed. Relative to the rest value, the threshold value of the tire-pressure monitor 13, at a driving speed of 260 km/h, is here increased by p=0.5 bar. Without an additional mass 30, the threshold value according to characteristic curve b, by the mass of the diaphragm 21, would only increase insignificantly by about 0.1 bar. The characteristic curve c shows the minimum tire pressure up to which the tire would be destroyed under full load. This characteristic curve likewise rises progressively with the speed and intersects the characteristic curve b before the maximum speed is reached. Without an additional mass, the tire, at high speeds and when air pressure is not increased, would consequently be damaged without warning from the tire-pressure monitoring device. By the additional mass 30, the threshold value is now increased from the characteristic curve b to the characteristic curve a so that the characteristic curve c is no longer intersected. The result of this is that a tire pressure, sufficient in the lower speed range, of, for example, 2.1 bar is now sufficient only up to a speed of 130 km/h. At higher speeds, the threshold value of the tire-pressure monitor 10 according to characteristic curve a is increased above the existing tire pressure by the additional mass 30. The diaphragm 21 consequently lifts from the contact 24 and a warning signal is transmitted to the warning indicator 17, which signals to the driver to reduce the vehicle speed or increase the tire pressure.

In calculating a silicone layer, as an additional mass, applied uniformly to the top side of the diaphragm and filled with tungsten powder, first of all the stiffening factor of the diaphragm is calculated in a known manner. It is dependent upon the modulus of elasticity $E=200,000$ $N/mm^2$ for steel, the diaphragm thickness and the transverse extension 0.3 for steel. With this stiffening factor K, the deflection of the diaphragm centre at a certain increase in the tire pressure p at a known diaphragm radius can be calculated. This deflection must now be compensated by the centrifugal forces effective on the additional mass 30 and the diaphragm 21 in order to thereby increase the threshold value by [lacuna] as a function of speed in accordance with the characteristic curve a in FIG. 3. The total mass exposed to the centrifugal forces can be determined in a known manner with the rotational radius of the diaphragm, the driving speed of the vehicle, the diaphragm diameter and the stiffening factor. The mass of the diaphragm, which mass is of the dimensions and the density=7.9 $g/cm^3$ for steel, is subtracted from the total mass thus determined, and the required value for the quantity of the additional mass 30 is thus obtained. In the example, a thickness of 1.0 mm is obtained at a density of 3 $g/cm^3$ for the material of the additional mass 30 applied in a uniformly distributed manner.

Figure 4:
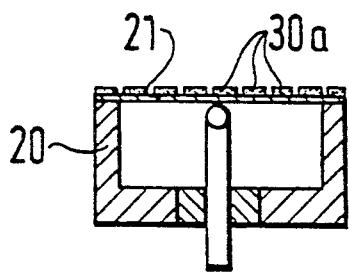

Instead of the additional mass 30 applied uniformly to the entire diaphragm area, this additional mass can also be applied in a uniformly distributed manner to the diaphragm surface in a grid according to FIG. 4. Here, too, the additional mass 30a can be determined in the abovementioned manner. The quantity of the additional mass is expediently determined here per unit of area of the diaphragm and attached to the topside of diaphragm sheets by printing, adhesive bonding or the like in a grid-shaped surface pattern before the diaphragm is punched out.

Figure 5:
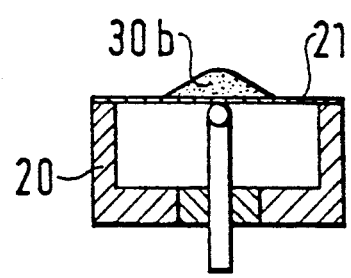

According to FIG. 5, however, the additional mass 30b can also be adhesively bonded in a heaped manner to the centre region remote from the contact area of the diaphragm 21. Here, however, at the same increase, as a function of speed, according to the characteristic curve a from FIG. 3, a smaller quantity of silicone adhesive, as additional mass 30b, filled with metal powder is required, since this additional mass 30b only acts in the centre region of the diaphragm and would thereby cause greater deflection of the diaphragm 21. In this arrangement of the additional mass 30b, to determine the centrifugal force-dependent deflection of the diaphragm, a correction value to be determined empirically or by calculation has to be taken into account due to the non-point-like fixing of the additional mass in the diaphragm centre. However, in the case of a silicone adhesive filled with metal powder and having a modulus of elasticity $E=10$ N/mm², here, too, due to the elasticity of the additional mass 30b, no stiffening of the diaphragm is to be found.

Within the scope of the invention, it is also possible to attach the additional mass to the side of the diaphragm 21 directed towards the reference-pressure chamber 20, in particular in an annular shape around the contact pin 22, where it is better protected against mechanical damage, for example during assembly of the tire-pressure monitor 13. Likewise, the additional mass can be attached in a distributed manner to both diaphragm sides. Thus, for example for various characteristic curves, a quantity of additional mass which is always the same can be attached to the inside and a balancing quantity can be attached to the outside of the diaphragm 21. It is essential to the invention in all these solutions of identical effect that the total mass of the diaphragm 21 for increasing the switching-threshold value as a function of speed is increased without having an effect on the rigidity and shape of the diaphragm. Particularly suitable for this are materials having a very low modulus of elasticity and high density. By such an additional mass, the centrifugal-force effect during the increase in the threshold value can be set in a defined, inexpensive and simple manner. The material of the mass is to be selected in such a way that its modulus of elasticity is considerably less than 1/10th, preferably at least 1/100th of the modulus of elasticity of the diaphragm 21.

I claim:

1. Tire-pressure monitor for vehicles, comprising a pressure switch which is to be fixed to the periphery of the wheel rim of vehicle wheels radially to the wheel axis, is to be actuated by the tire pressure and has a reference-pressure chamber which is closed off towards the tire by an electrically conductive diaphragm which is arranged parallel to the tread of the tire and carries an additional mass provided for increasing the switching threshold as a function of speed, and a contact which is inserted in an electrically insulated manner into the reference-pressure chamber and against which, when air pressure in the tire is sufficient, a contact area at the centre region of the diaphragm bears for closing an electric circuit, in which arrangement the state of the electric circuit is to be monitored in a cordless manner by a receiver fixed to the vehicle and having an analysing circuit, characterized in that the diaphragm (21) is free towards the tire (11) and the additional mass (30, 30a, 30b) is applied over the surface to at least one diaphragm side and is also made of a material whose modulus of elasticity is less than 1/10th of the modulus of elasticity of the diaphragm (21).

2. Tire-pressure monitor according to claim 1, characterized in that the additional mass (30, 30a, 30b) is a silicone adhesive filled with a metal powder, preferably of tungsten.

3. Tire-pressure monitor according to claim 1, characterized in that the additional mass (30) is applied with uniform thickness and over the full surface to the side of the diaphragm (21) directed towards the tire.

4. Tire-pressure monitor according to claim 1, characterized in that the additional mass (30a) is applied in a uniformly distributed grid shape to the surface of the diaphragm (21) directed towards the tire (11).

5. Tire-pressure monitor according to claim 1, characterized in that the additional mass (30b), on the centre region of the diaphragm (21), is adhesively bonded in a heaped manner to the side remote from the contact area.

* * * * *